Jan. 28, 1958          G. FRANCIS          2,821,287
MULTIPLE AUTOMOBILE PARKING DEVICE
Filed June 29, 1956          3 Sheets—Sheet 1
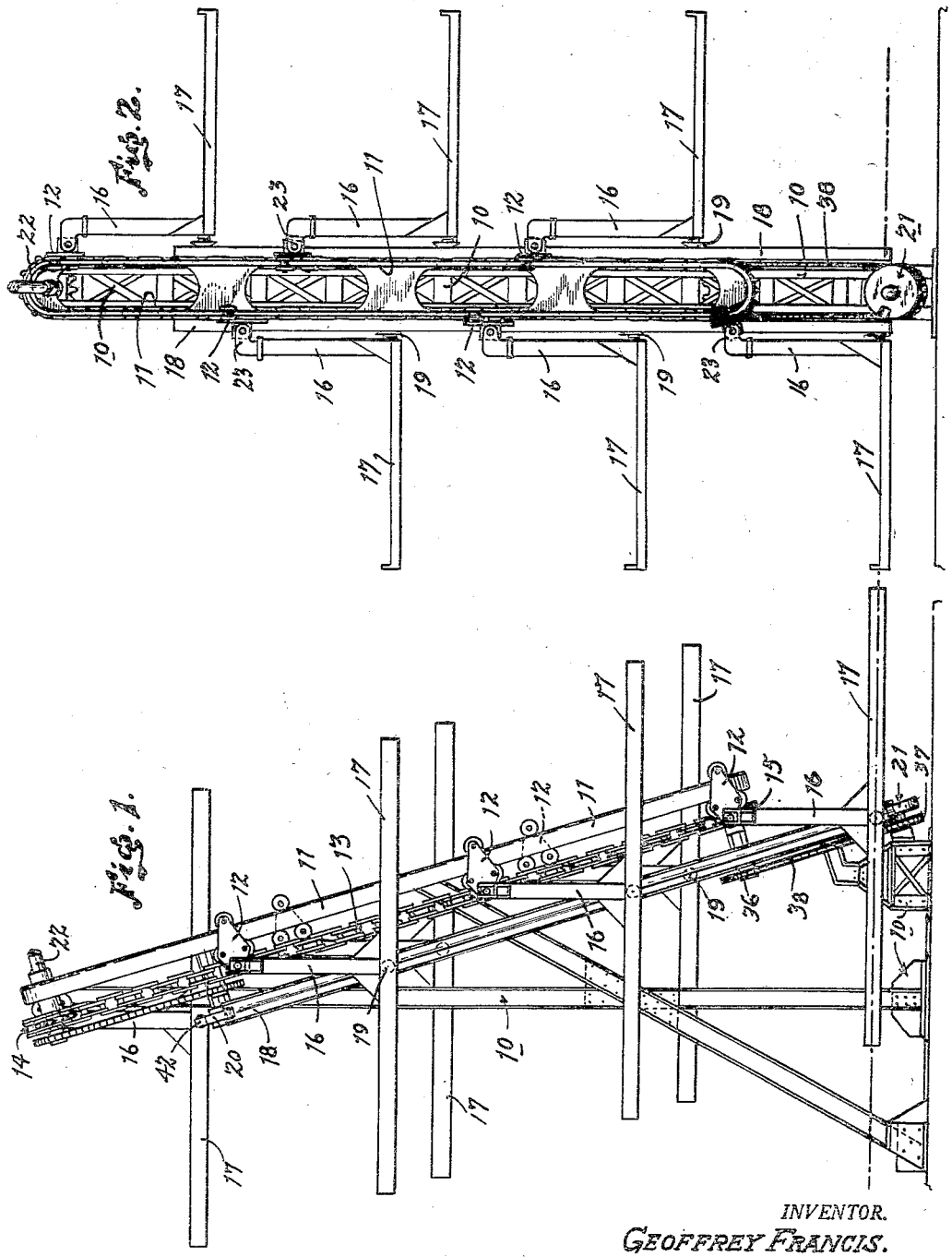
INVENTOR.
GEOFFREY FRANCIS.
BY
ATTORNEY

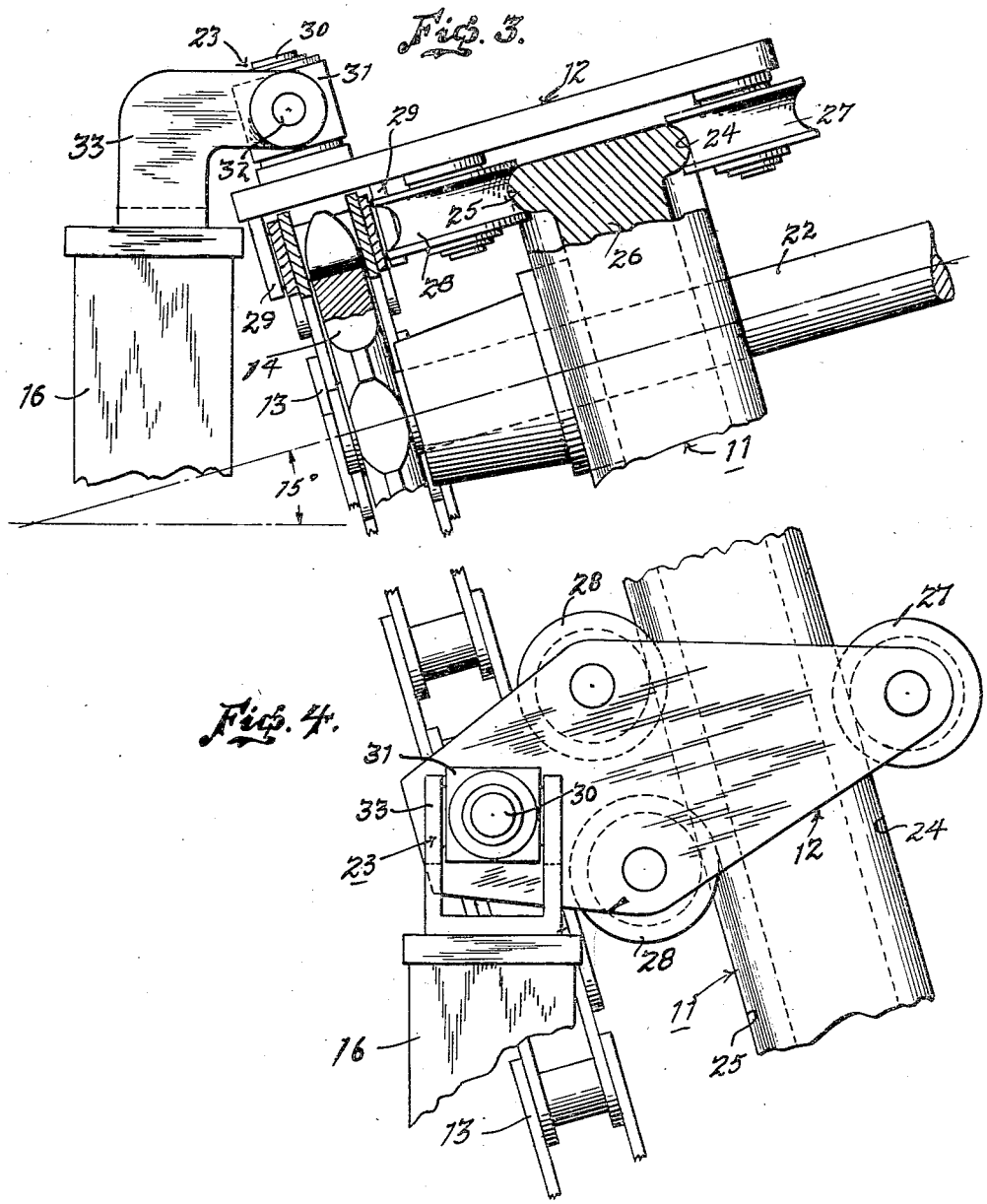

Jan. 28, 1958 G. FRANCIS 2,821,287
MULTIPLE AUTOMOBILE PARKING DEVICE
Filed June 29, 1956 3 Sheets-Sheet 3
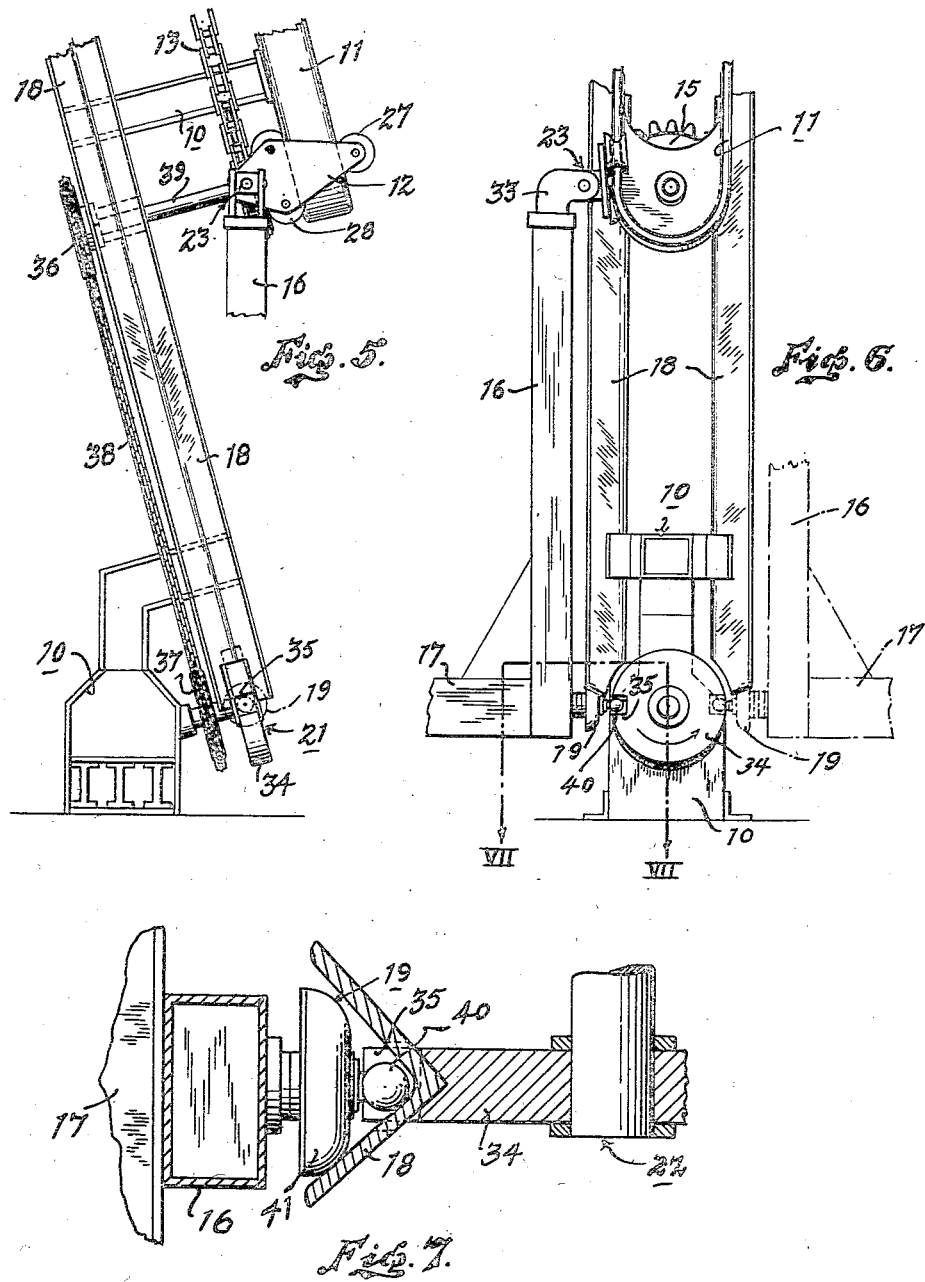
INVENTOR.
GEOFFREY FRANCIS.
BY
ATTORNEY United States Patent Office 2,821,287
Patented Jan. 28, 1958

2,821,287

MULTIPLE AUTOMOBILE PARKING DEVICE

Geoffrey Francis, San Francisco, Calif.

Application June 29, 1956, Serial No. 594,916

12 Claims. (Cl. 198—158)

My present invention relates to an improved automobile parking and storage means and more particularly to a mechanical device for increasing the capacity of a parking lot where property values, space and other considerations make a conventional garage structure impractical.

The main object of my invention is to provide a parking device by which a plurality of automobiles may be parked one above the other in an effective, economical and practical manner.

A further object of the invention is to provide an automobile parking and storing device employing a number of movable pallets or platforms by which a number of automobiles are stored or parked upon individual pallets that move in inclined paths at opposite sides of a supporting structure.

Another object of the invention is to provide a new and novel form of automobile parking device in which a plurality of automobiles are parked upon platforms or pallets that are carried upon a circuitous or oblong trackway extending in an inclined plane about a supporting structure and in which said platforms and pallets are supported upon said trackway in such a manner that the necessity for a complicated transfer mechanism for the transposition of the automobile supporting platforms or pallets from one to the other side of said supporting structure is avoided in a novel manner.

Another object of the invention is to provide an automatic automobile parking device having a plurality of automobile supporting platforms or pallets suspended in a novel manner upon a trackway to move upwardly in escalator fashion to a point where the platforms or pallets are turned about for descent to the parking lot so that in parking, the automobiles can be driven directly upon a supporting platform or pallet and in departing the automobile may be driven directly from its supporting platform or pallet.

Another object of my invention is to provide a mechanical automobile parking device that may be set up in a parking lot and employed to park a greater number of automobiles than would be possible within the ground area occupied by the parking device and featured by the fact that the automobiles are parked upon individual platforms and turned about so that the automobile may be driven directly upon or from the platform without backing or other complicated maneuvering.

Other objects and advantages will be in part evident to those skilled in the art and in part pointed out hereinafter in connection with the accompanying drawings wherein there is shown by way of illustration and not of limitation a practical embodiment of the invention.

In the drawings:

Figure 1 is a side view of a device constructed in accordance with a preferred form of my present invention, Figure 2 is a front view of the device viewed from the right of Figure 1, Figures 3 and 4 are enlarged fragmentary views of details of construction as illustrated in Figures 1 and 2 of the drawings, Figure 5 is an enlarged fragmentary view taken at the lower end of the device as shown in Figure 1, Figure 6 is an enlarged fragmentary view taken at the lower end of the device as shown in Figure 2, and Figure 7 is an enlarged and sectional view, taken along line VII—VII of Figure 6 looking in direction of arrows and showing other details of construction.

The art to which this invention relates, abounds with showings of various devices by which a plurality of automobiles may be parked in tiers one above the other to provide additional parking space in parking lots where ground level parking space is at a premium. In each of these prior devices the problem of parking automobiles in this manner upon supporting platforms which move upwardly from ground level in one tier and return to ground level in an adjacent tier, provision must be made for the transfer or lateral movement of the automobile carrying platforms from one tier to the other at the upper and lower ends of the tiers so provided. In many of these prior devices the automobile supporting platforms are carried upon a circuitous trackway or frame in such a manner that when driven thereupon for parking, the automobile must later be backed therefrom in departing and since the backing of an automobile from such a device is difficult the departing of the automobile should be performed by an attendant as this operation can only be safely performed by a skilled driver. This all tends to increase the cost of operation and restrict the use of such devices and it is, therefore, a final object of my present invention to provide a mechanical automobile parking structure upon which a plurality of automobile supporting platforms are arranged to move upwardly and downwardly in adjacent tiers in a continuous manner and without the necessity for any complicated means by which the automobile supporting platforms are transferred or transposed from an upwardly moving tier to a downwardly moving tier and vice-versa and one in which, due to an inherent characteristic of the trackway, the automobile supporting platforms or pallets are turned about in a novel manner, so that in parking and departing, the automobile may be driven onto and from the supporting platform in a forward direction. As a consequence a backing or other complicated maneuvering of the automobile either in parking or departing is avoided.

For a general description of the invention reference is now made to Figures 1 and 2 of the accompanying drawings, wherein the numeral 10 designates generally a supporting frame or structure which may take any desired form. In practice, however, and to economize in space requirements, this frame 10 will preferably be of narrow construction so that when employed, as will be hereinafter pointed out, the land area requirements for the device will be held to a minimum. Mounted upon the frame 10 and extending therearound in an inclined plane, there is a continuous trackway 11 which as shown is of oblong configuration. Mounted upon this trackway 11, I provide a plurality of trolleys 12 that are moved about in spaced relation along the trackway 11 by a driving chain 13 that passes over sprockets 14 and 15 at the rounded upper and lower limits of the trackway 11. These sprockets 14 and 15 have a pitch diameter conforming to the radius of the rounded upper and lower ends of the trackway 11. As the trolleys 12 are connected to the driving chain 13 at closely spaced points, they will maintain their normal positions upon the trackway 11. At the point where the trolleys 12 are connected to the driving chain 13 and outwardly with respect thereto, the trolleys 12 are shown as carrying a pallet supporting mast or upwardly extending member 16 by which automobile supporting platforms or pallets 17 are suspended and moved in an inclined path upwardly and downwardly along opposite sides and around the ends of the frame 10 as the driving chain 13 is operated. A novel feature to be described in greater detail hereinafter, resides in the fact that the connection between the trolleys 12 and the upstanding mast 16 by which the automobile supporting platforms or pallets 17 are suspended is articulated and operates in the manner of a conventional universal joint. Therefore, as will hereinafter appear, the automobile supporting platforms or pallets 17 will be carried around the upper and lower ends of the frame 10 without resort to any additional supporting trackway or independant platform or pallet supporting means.

With the automobile supporting platforms or pallets 17 suspended in this manner from the several trolleys, it will be apparent that there is established a horizontal component of force due to the weight of the platform and load thereupon which tends to swing the platforms 17 inwardly toward the frame 10. To overcome this and maintain the platforms or pallets 17 in a stabilized and horizontal automobile supporting position as they are moved upwardly and downwardly along opposite sides of the frame 10, I show two spaced and oppositely disposed channel-like stabilizing rails 18, with which a roller or other means 19 carried by each of the pallets is adapted to engage when the trolleys 12 are moved upon the inclined parallel portions of the trackway 11 extending along opposite sides of the frame 10. As the trolleys 12 are carried around the upper and lower ends of the trackway 11 the stabilizing means 19 carried by the platforms or pallets 17 will disengage the stabilizing rails 18 with which they are in contact and engage a novel transfer means 20 and 21 respectively at the apex and base of the frame 10 that operates, as will hereinafter appear, between the spaced upper and lower ends of the stabilizing rails 18.

From the above general descripiton of the device, it will be seen that as the driving chain 13 is operated the trolleys 12 will be carried around the trackway 11 in spaced relation and upwardly along an inclined path at one side of the structural supporting frame 10, around the upper end thereof and downwardly along a similarly inclined path at the opposite side of the supporting frame 10, where at the base of the supporting frame 10, the trolleys will be again carried over to the ascending side of the trackway 11 for a repetition of the circuit. In practice, it is contemplated that the driving chain 13 will be driven by an electric motor (not shown) that is connected to a shaft 22 which carries the sprocket 14 at the top of the frame 10. If it is assumed that the supporting platforms 17 move in a counter-clockwise direction, as viewed in Figure 2 of the drawing, an automobile in being deparked from the lowermost platform 17, will be driven forward from its supporting platform to and through an exit lane when the platform is substantially in the position here shown. In parking the automobile will be driven forward from an entrance lane to the supporting platform or pallet 17 when said platform has moved around to a corresponding position at the right side of the supporting frame 10. In these operations, the platforms 17 will be stopped substantially level with a ramp or driveway, the surface of which is indicated by dot and dash lines. If desired the operation of parking and deparking an automobile upon a platform or pallet 17 may be carried out in either of the above positions from a common entrance and exit lane at one or the other side of the frame 10, or the entrance and exit lane may extend transversely of the frame 10 at the level assumed by the platforms or pallets 17 when the trolleys 12 are in their lowermost position midway between the trackway 11 at each side of the supporting frame 10.

Reference is now made to Figures 3 and 4 of the drawings for a more detailed description of the trackway 11, the trolleys 12 with their operating chain 13 and the articulated universal connection, here designated generally by the numeral 23, by which the masts or suspension brackets that carry the platforms 17 are connected to and carried by the trolleys 12. While the trackway 11 may take many forms, I have illustrated a rail having an outer face with oppositely extending and rounded flanges 24 and 25 that are formed upon an inwardly extending body portion 26 or web section by which the rail is secured upon the supporting frame 10. The flanges 24 and 25 of the rail section 26 are respectively engaged by flanged wheels or rollers 27 and 28 that are journalled upon and carry the trolleys 12. In this arrangement, I have shown a single roller 27 at the outer end of the trolley 12 and two additional rollers 28 at the inner end of the trolleys 12, but it is to be understood that the number of these rollers may be increased or rearranged as to position. In fact, I may employ two of the rollers 27 at the outer end of the trolleys 12.

In Figure 3, it will be noted that the shaft 22 which carries the chain sprocket 14 is journalled in fixed relation with the trackway 11 so that the pitch line of the sprocket 14 is in alignment with the rail forming flanges 24 and 25 of the rail section 26 and as a consequence the chain 13, which is here shown as connected to the trolleys through inwardly extending flanges 29 carried by the trolleys 12, will exert a tractive force upon the trolleys 12 in alignment with and follow the curvature of the trackway 11 at the upper and lower ends thereof. Extending outwardly from each of the trolleys 12 and in line with the central plane of the sprocket 14 there is an extending pin or stub shaft 30 which carries a rotatable block 31. Upon opposite sides of this rotatable block 31 there are trunnions 32 with which a right-angled bracket 33 is journalled. As indicated in Figure 3 of the drawing, the bracket 33 provides an offset for the depending suspension mast 16 in such a manner that when the trolleys 12 pass over and around the upper circular portion of the trackway 11, there will be no interference with the movement of the trolleys 12 and/or the platforms 17 as the latter are carried around from one to the other side of the supporting frame 10 in the manner hereinbefore mentioned.

While the articulated universal connection 23 between the trolleys 12 and the masts 16 of the automobile supporting platforms or pallets 17 provides a means by which the masts 16 and their supported platforms 17 may be carried around the upper and lower ends of the inclined trackway 11, additional means is provided by which the masts 16 are held in a vertical position and against any inward or lateral movement toward the frame 10 due to the aforementioned horizontal component of force. With the universal connection 23 between the trolleys 12 and the masts 16, it will be readily seen that due to the off-center load created by an automobile upon a platform or pallet 17 the mast 16 will tend to swing inwardly and it is to meet this situation that the stabilizing rails 18 and the rail engaging means 19 carried at the lower end of the masts 16 are designed.

For a more detailed description of the pallet stabilizing mechanism, by which the stabilizing rails 18 and the stabilizing means 19 serve in conjunction with the universal connection 23 between the trolley 12 and the masts 16, to perform their function, reference is now made to the remaining figures of the drawings.

In Figures 5 and 6 of the drawings, there is reproduced in more detail the lower portion of the parking device as illustrated respectively in Figures 1 and 2 of the drawings, with the structural supporting frame 10, and other nonessential elements omitted for clarity. As indicated in these figures of the drawings, the stabilizing rails 18 which are disposed parallel and below the inclined trackway 11 extend downwardly beyond the lower end of the trackway 11 a distance dependent upon the length of the masts 16. As the trolleys 12 move around the lower curved end of the trackway 11, the stabilizing rail engaging means 19 at the lower end of the masts 16 will leave the stabilizing rail at one side of the frame 10 and, as will be pointed out in more detail, the means 19 will then engage the transfer means 21, previously mentioned as disposed between the lower ends of the spaced stabilizing rails 18. As shown in these figures of the drawings, the transfer means 21 comprises a drum-like member 34 having a notch 35 that functions as a stabilizing means in lieu of the stabilizing rails 18 as the trolleys 12 carry the masts 16 around the lower end of the supporting frame 10. The drum-like member 34 is driven in synchronism with the movement of the trolleys 12 by means of sprockets 36 and 37 which are connected by a driving chain 38. The drive for the sprocket 36 is provided by a shaft 39 that also carries the lower sprocket 15 which carries the trolley operating chain 13. When the trolleys 12 reach the point upon the trackway 11, as illustrated in Figure 6 of the drawing, the rail engaging means 19 will become disengaged from the stabilizing rail 18 at the left of the supporting frame 10; then as this occurs a spherical extension 40, forming a part of the stabilizing means 19, shown more clearly in Figure 7 of the drawings, will enter into the notch 35 of the transfer drum 34 and because of the angular inclination of the drum 34, the supporting mast 16 and the supporting platform or pallet 17 carried thereby, will be held in its proper horizontal position until the particular mast has been carried around to a point at the other side of the supporting frame 10 where, as indicated by dot and dash lines, the stabilizing means 19 will engage with the stabilizing rail 18 at the right of the supporting frame 10 for stabilized movement of the platforms or pallets 17 upwardly along this side of the supporting frame.

With particular reference to Figure 7 of the drawings, it will be noted that the stabilizing means 19 at the lower end of the masts 16 also incorporate a rounded roller or wheel 41 which will normally engage between the sides of the stabilizing rails 18, here shown as of right angle cross-section. Extending centrally from the means 19 there is the spherical extension 40 which may be a fixed portion of the shaft upon which a roller 41 is mounted. This spherical extension 40 is of a dimension such that it will fit snugly into the notch 35 of the rotary drum 34 as the mast 16 with the platform or pallet 17 is moved around from its position of descent at one side of the frame 10, to a position for ascent at the other side of the frame 10 as the trolley 12 is carried around the trackway 11 by the operating chain 13.

By now referring back to Figure 1 of the drawing, it will be noted that a similar transfer mechanism, designated generally by the numeral 20, also comprises a rotary drum 42 having a notch that is adapted and arranged to engage with the spherical extension 40 of the stabilizing means 19 as the mast 16 with its supported platform or pallets 17 is at this point carried upwardly and around the upper rounded end of the trackway 11 by its supporting trolley 12. In this instance, the stabilizing rails 18 terminate short of the upper end of the trackway 11 at a point where the lower end of the mast 16 with its stabilizing means 19 will cooperate therewith.

It is considered that the operation of my invention will be clear from the above description and it, therefore, seems only necessary to state that as the operating chain 13 is driven in a counter-clockwise direction, as viewed in Figure 2 of the drawing, the upper pallet or supporting platform 17 at the right of this view will continue to move upwardly, and after being carried around the upper end of the trackway 11, it will descend along the left hand side of the frame 10 until it reaches the lower rounded end of the trackway 11 where it will be carried around and turned end for end as it is brought into a corresponding position at the other side of the supporting frame 10.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an automobile parking device of the character described, the combination of a structural supporting frame, a pallet supporting trackway formed as a closed loop having parallel portions disposed in an inclined plane at opposite sides of said supporting frame, a power transmitting means operating in a plane spaced from and parallel with said trackway, said power transmitting means being adapted and arranged to follow the closed loop contour of said trackway, a plurality of trolleys mounted in spaced relation upon said trackway having driving connections with said power transmitting means, a plurality of horizontally disposed load supporting pallets each having a vertical mast connected at its upper end to one of said trolleys, means forming an articulated universal connection between the upper ends of said masts and said trolleys, whereby said pallets will be carried in a suspended position about said trackway as said trolleys are moved around said trackway by said power transmitting means, a pallet stabilizing means supported by said structural frame, and means carried by each of said pallets and engaging said pallet stabilizing means, whereby said pallets will be held in a horizontal plane as they are moved along and around said trackway from one to the other side of said supporting frame by the operation of said power transmitting means.

2. In an automobile parking device of the character described, the combination of a structural supporting frame, a pallet supporting trackway formed as a closed loop and having portions disposed in an inclined plane along opposite sides of said supporting frame, a power transmitting chain operating around sprockets mounted in an inclined plane spaced from and parallel with and below said inclined trackway, said power transmitting chain being adapted and arranged to follow the path of said trackway, a plurality of trolleys mounted in spaced relation upon said trackway having driving connections with said power transmitting chain, a plurality of horizontally disposed load supporting pallets, each of said pallets having a vertical suspension means extending upwardly at one side thereof connected to one of said trolleys, means forming an articulated universal connection between the upper ends of said suspension means and said trolleys, whereby said pallets will be carried in a suspended position by said trolleys as said trolleys are moved around said trackway by said power transmitting chain, a pallet stabilizing means supported by said structural frame, and means upon each of said pallets engaging said pallet stabilizing means, whereby said pallets will be held in a horizontal plane as they are moved around said trackway by the operation of said power transmitting chain.

3. In an automobile parking device of the character described, the combination of a structural supporting frame, a pallet supporting trackway formed as a closed loop and with parallel portions extending in an inclined plane along opposite sides of said supporting frame, a power transmitting means operating in a plane spaced from and parallel with said trackway, said power transmitting means being adapted and arranged to follow the path of said trackway, a plurality of trolleys mounted in spaced relation upon said trackway having driving connections with said power transmitting means, a plurality of horizontally disposed load supporting pallets each having a suspension mast at one side thereof connected at its upper end to one of said trolleys, means forming an articulated universal connection between the upper ends of said masts and said trolleys, whereby said pallets will be carried in a suspended position by said trolleys as said trolleys are moved around said trackway by said power transmitting means, a pair of spaced pallet stabilizing rails supported by said structural frame, and means carried by each of said pallets engaging said pallet stabilizing rails, whereby said pallets will be held in a horizontal plane as they are moved along said trackway by the operation of said power transmitting means.

4. In an automobile parking device of the character described, the combination of a structural supporting frame, a pallet supporting and guiding trackway formed as a closed loop having rounded upper and lower end portions with connecting spaced parallel side portions extending flatwise with respect to each other along an inclined plane, a power transmitting means operating in a spaced plane parallel with said trackway, said power transmitting means being adapted and arranged to follow the path of said trackway, a plurality of pallet supporting trolleys mounted in spaced relation upon said trackway and having driving connections with said power transmitting means, a plurality of horizontally disposed load supporting pallets each having an upwardly extending suspension mast at one side thereof connected to a supporting trolley, means forming an articulated connection between the upper ends of said masts and said trolleys, a pair of spaced pallet stabilizing rails supported by said structural frame extending parallel with and in an inclined plane below the plane of said pallet supporting and guiding trackway, means carried by each of said pallets engaging said spaced pallet stabilizing rails, whereby said pallets will be held in a horizontal plane as they are carried upwardly and downwardly along the inclined plane of said trackway by said trolleys, and means between the spaced ends of said stabilizing rails engaged by the means carried by each of said pallets for maintaining said pallets in a horizontal plane as they are moved around the upper and lower ends of said trackway by an operation of said power transmitting means.

5. In an automobile parking device of the character described, the combination of a structural supporting frame, a pallet supporting and guiding trackway formed as a closed loop having rounded upper and lower end portions with connecting spaced parallel side portions extending flatwise with respect to each other along an inclined plane, a power transmitting chain movable in a plane spaced from said trackway, said power transmitting chain being adapted and arranged to follow the path of said trackway, a plurality of pallet supporting trolleys mounted in spaced relation upon said trackway and having a driving connection with said power transmitting chain, a plurality of horizontally disposed load supporting pallets each having an upwardly extending mast at one side thereof, means forming an articulated universal connection between the upper ends of each of said masts and a supporting trolley, a pair of spaced stabilizing rails supported by said structural frame below the plane of said pallet supporting and guiding trackway, means carried by each of said pallets for engaging said stabilizing rails as they move along the spaced parallel portions of said trackway, whereby said pallets will be held in a horizontal plane as they are carried upwardly and downwardly along said trackway by said trolleys, and means at the spaced upper and lower ends of said pair of spaced stabilizing rails for maintaining said pallets in a horizontal plane as said trolleys are carried over the rounded end portions of said trackway by said power transmitting chain.

6. In an automobile parking device of the character described, the combination of a structural supporting frame, a pallet guiding trackway formed as a closed elongated loop having half-circle upper and lower end portions with spaced and connecting side portions extending along an inclined plane, a power transmitting chain operating in a plane spaced below said trackway, said power transmitting chain being disposed over sprockets at the upper and lower ends of the loop formed by said trackway, a plurality of trolleys mounted in spaced relation upon said trackway and connected to said power transmitting chain, a plurality of pallets each having a horizontally disposed load supporting platform and an upwardly extending mast at one side thereof, means forming an articulated universal connection between each of said masts and a trolley, a pair of pallet stabilizing rails carried by said structural frame extending in an inclined plane parallel with and below the plane of said pallet supporting and guiding trackway, means at the base of each of the masts carried by said pallets engaging one of said pallet stabilizing rails, whereby the load supporting platform of said pallets will be held in a horizontal plane as said pallets are carried upwardly and downwardly along the spaced and connecting side portions of said trackway with said trolleys, and means at the upper and lower ends of said stabilizing rails for maintaining the load supporting platform of said pallets in a horizontal plane as said pallets are carried by said trolleys around the half-circle upper and lower ends of said trackway by said power transmitting chain.

7. In an automobile parking structure of the character described, the combination of a supporting frame, a trolley supporting trackway of oblong configuration having spaced side portions extending parallel along a plane inclined at an angle of approximately 15° from vertical, a trolley driving chain movable in an oblong path conforming to the configuration of said trackway in a plane parallel with and spaced to one side of said trackway, a pallet supporting trolley mounted for movement around said trackway and connected to said driving chain, a horizontally extending load supporting pallet having a vertically extending side portion connected at its upper end to said trolley, an articulating universal connection between the upper end of said side portion and said supporting trolley, a pallet stabilizing means extending from said pallet at the base of the side portion thereof, and oppositely disposed stabilizing rails extending in spaced parallel relation along the under side of said trackway engaged by said pallet stabilizing means for maintaining the load supporting portion of said pallet in a horizontal position as said pallet is carried along said trackway.

8. In an automobile parking structure of the character described, the combination of a supporting frame, a trolley supporting trackway of oblong configuration having spaced side portions extending parallel along a plane inclined at an angle of approximately 15° from vertical, a trolley driving chain movable in an oblong path conforming to the configuration of said trackway in a plane parallel with and spaced to one side of said trackway, a pallet supporting trolley mounted for movement around said trackway and connected to said driving chain, a horizontally extending load supporting pallet connected to and suspended from said trolley, an articulating universal connection between said pallet and said supporting trolley, a pallet stabilizing means extending from said pallet below said articulating universal connection, a pair of oppositely disposed stabilizing rails extending in spaced parallel relation with said trackway and engaged by said pallet stabilizing means, and means disposed between the ends of said oppositely disposed stabilizing rails for maintaining the load supporting portion of said pallet in a horizontal position as said pallet stabilizing means is carried around said trackway from one to the other of said pair of oppositely disposed stabilizing rails.

9. In an automobile parking device of the character described, the combination of a supporting frame of relatively narrow construction, a circuitous trackway disposed in an inclined plane upon said supporting frame having rounded end portions and connecting side portions extending substantially along the sides of said structural frame, a plurality of trolleys mounted upon said trackway for movement therearound, a pair of pallet stabilizing channel-like rails spaced below said inclined trackway, a pallet carrying bracket suspended from each of said trolleys by a universal articulating connection at its upper end and having means engaging said pallet stabilizing channel-like rails at its lower end, whereby said brackets will be retained in a vertically extending position as the trolleys to which they are connected traverse said trackway, a power transmitting chain supported by sprockets having a pitch diameter conforming with the curvature of said trackway at the upper and lower ends thereof to which each of said trolleys are connected for movement in spaced relation around said inclined trackway, and means operating between the upper and lower ends of said pallet stabilizing channel-like rails for maintaining said pallet carrying brackets in a vertical pallet supporting position during the travel of said trolley supporting brackets from one to the other side of said supporting frame.

10. In an automobile parking device of the character described, the combination of a supporting frame of relatively narrow construction, a circuitous trackway disposed in an inclined plane upon said supporting frame having rounded end portions and connecting side portions extending substantially along the sides of said structural frame, a plurality of trolleys mounted upon said trackway for movement therearound, a pair of pallet stabilizing channel-like rails spaced below said inclined trackway, a pallet carrying bracket suspended from each of said trolleys by a universal articulating connection at its upper end and having means engaging said pallet stabilizing channel-like rails at its lower end, whereby said brackets will be retained in a vertically extending position as the trolleys to which they are connected traverse said trackway, a power transmitting chain supported by sprockets having a pitch diameter conforming with the curvature of said trackway at the ends thereof to which each of said trolleys are connected for movement in spaced relation along said inclined trackway, rotary means at the upper and lower ends of said pallet stabilizing channel-like rails for maintaining said pallet carrying brackets in a pallet supporting position during the travel of said trolley supporting brackets from one to the other side of said supporting frame, and a driving connection for said rotary means synchronized with said power transmitting chain.

11. In an automobile parking device of the character described, the combination of a supporting frame of relatively narrow construction, a circuitous trackway disposed in an inclined plane and extending around said supporting frame, a plurality of trolleys mounted upon said trackway for movement about said supporting frame, a pallet carrying bracket suspended from each of said trolleys by a universal articulating connection, a pair of spaced bracket stabilizing channel rails below said inclined trackway, means carried by the lower end of said brackets engaging said stabilizing channel rails, whereby said pallet carrying brackets will be retained in a vertically extending position as the trolleys to which they are connected traverse said trackway, a horizontally disposed pallet platform carried by each of said brackets and extending outwardly from said supporting frame, a moving power transmitting means having a path of movement conforming with the path of said trackway to which each of said trolleys are connected for movement in spaced relation along said circuitous trackway, and means at the ends of said spaced bracket stabilizing channels engaged by the means of the lower ends of said brackets for stabilizing said brackets during the travel of said trolleys from one to the other side of said supporting frame.

12. In an automobile parking device of the character described, the combination of a supporting frame of relatively narrow construction, a circuitous trackway disposed in an inclined plane and extending around said supporting frame, a plurality of trolleys mounted upon said trackway for movement about said supporting frame, a pallet carrying bracket suspended from each of said trolleys by a universal articulating connection, a pair of spaced bracket stabilizing rails below said inclined trackway, means carried by the lower end of said brackets alternately engaging said stabilizing rails as said brackets are moved along each side of said supporting frame by said trolleys, whereby said pallet carrying brackets will be retained in a vertically extending position as the trolleys to which they are connected traverse said trackway, a horizontally disposed pallet platform carried by each of said brackets and extending outwardly at the sides of said supporting frame, a moving power transmitting chain having a path of movement conforming with the path of said trackway to which each of said trolleys are connected for movement in spaced relation along said circuitous trackway, and rotary means between the spaced ends of said spaced bracket stabilizing rails engaged by the means carried by the lower end of said brackets for stabilizing said brackets during the travel of said trolleys from one to the other side of said supporting frame, and a driving connection for synchronizing the operation of said rotary means with the operation of said power transmitting chain.

References Cited in the file of this patent

UNITED STATES PATENTS 2,682,958     Francis _____ July 6, 1954